United States Patent
Harano (10) Patent No.: US 8,654,357 B2
(45) Date of Patent: Feb. 18, 2014

(54) INFORMATION PROCESSING APPARATUS, INFORMATION PROCESSING METHOD, AND PROGRAM FOR PRINTING CARBONLESS COPY PAPER

(75) Inventor: Yuzo Harano, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 225 days.

(21) Appl. No.: 13/344,470

(22) Filed: Jan. 5, 2012

(65) Prior Publication Data
US 2012/0182565 A1 Jul. 19, 2012

(30) Foreign Application Priority Data

Jan. 13, 2011 (JP) ................................. 2011-005027

(51) Int. Cl.
*G06K 15/02* (2006.01)
(52) U.S. Cl.
USPC .......................... 358/1.12; 358/1.15; 399/405
(58) Field of Classification Search
USPC .................................. 358/1.12, 1.15; 399/405
See application file for complete search history.

(56) References Cited

U.S. PATENT DOCUMENTS

| | | | |
|---|---|---|---|
| 2004/0017583 A1* | 1/2004 | Kageyama et al. | 358/1.15 |
| 2006/0127150 A1* | 6/2006 | Kimura | 399/405 |
| 2007/0229880 A1* | 10/2007 | Harmon et al. | 358/1.15 |
| 2008/0030784 A1* | 2/2008 | Sakuraba et al. | 358/1.18 |
| 2011/0242584 A1* | 10/2011 | Igarashi | 358/1.15 |

FOREIGN PATENT DOCUMENTS

JP 9-212040 A 8/1997

* cited by examiner

*Primary Examiner* — Qian Yang
(74) *Attorney, Agent, or Firm* — Canon USA, Inc., IP Division (57) ABSTRACT

An information processing apparatus includes a reception unit configured to receive a print instruction for printing a plurality of pages, a determination unit configured to determine whether a type of print paper designated by the print instruction is carbonless copy paper, and an assignment unit configured to assign to each of the plurality of pages, if the determination unit determines that the type of print paper designated by the print instruction is carbonless copy paper, carbonless copy paper with an attribute that corresponds to a position of each page within the plurality of pages.

10 Claims, 11 Drawing Sheets

INFORMATION PROCESSING APPARATUS, INFORMATION PROCESSING METHOD, AND PROGRAM FOR PRINTING CARBONLESS COPY PAPER

BACKGROUND OF THE INVENTION

1. Field of the Invention

The present invention relates to a technique useful for printing carbonless copy paper used, for example, for a ledger sheet that can produce multiple copies.

2. Description of the Related Art

Conventionally, there have been ledger sheets using carbonless copy paper. When a person writes in a specified field of such a ledger sheet, a copy of the sheet having the specified field filled out can be obtained. Further, Japanese Patent Application Laid-Open No. 9-212040 discusses a technique that can designate a paper feeder of the printing apparatus and a type of print paper used for printing each document. If an operator designates carbonless copy paper, the document is printed on one set of the corresponding sheets (carbonless copy paper).

However, designating the paper feeder and the type of print paper for each document of the print job is troublesome for the operator, and the operator cannot print one set of ledger sheets with simple settings. Additionally, since the paper feeder of the printing apparatus and the type of print paper are designated by human operation, a wrong paper feeder or paper other than the desired carbonless copy paper may be set due to human error. Accordingly, in some cases, a desired set of print products cannot be obtained.

SUMMARY OF THE INVENTION

The present invention is directed to printing a set of ledger sheets using carbonless copy paper with ease and accuracy.

According to an aspect of the present invention, an information processing apparatus includes a reception unit configured to receive a print instruction for printing a plurality of pages, a determination unit configured to determine whether a type of print paper designated by the print instruction is carbonless copy paper, and an assignment unit configured to assign to each of the plurality of pages, if the determination unit determines that the type of print paper designated by the print instruction is carbonless copy paper, carbonless copy paper with an attribute that corresponds to a position of each page within the plurality of pages.

According to an exemplary embodiment of the present invention, a set of ledger sheets using carbonless copy paper can be printed with ease and accuracy.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments, features, and aspects of the invention and, together with the description, serve to explain the principles of the invention.

DESCRIPTION OF THE EMBODIMENTS

Various embodiments, features, and aspects of the invention will be described in detail below with reference to the drawings.

Figure 1:
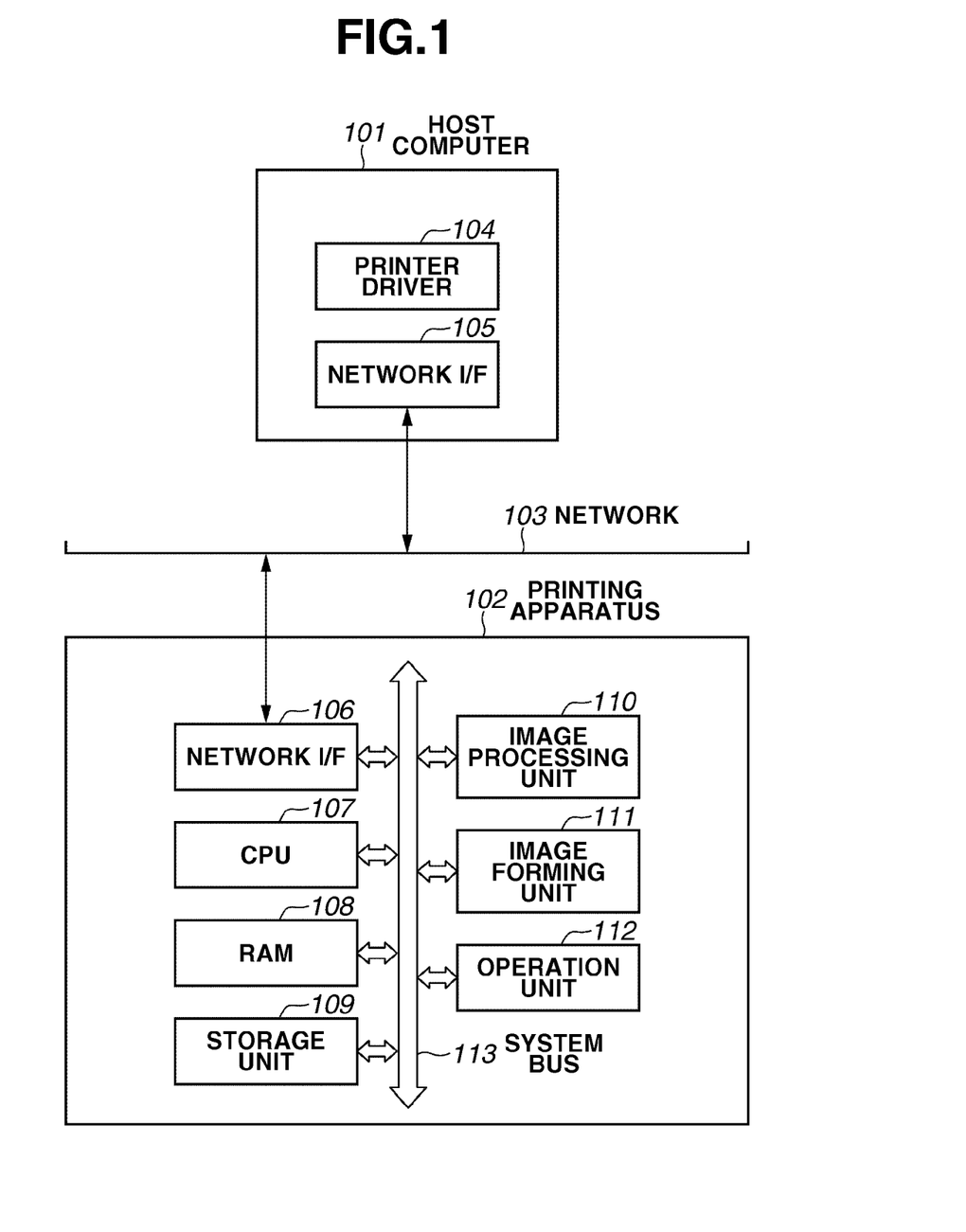
FIG. 1 illustrates a configuration of a printing system according to a first embodiment of the present invention.

FIG. 1 illustrates an example of a configuration of a printing system according to a first embodiment of the present invention.

The present invention can be applied not only to a system but to a single apparatus or a system including a plurality of apparatuses if a processing such as printing processing of the present invention can be executed. Further, if processing of the present invention can be executed, the present invention can be applied to a system which is connected to a network, such as a local area network (LAN) or a wide area network (WAN), which can realize the processing. A system, to which various terminals are connected, used in the embodiments described below is an example and a different system with a different configuration can also be used.

As illustrated in FIG. 1, the printing system according to the present embodiment includes a host computer 101 and a printing apparatus 102, which are mutually connected via a network 103. A printer driver 104 is installed in the host computer 101. The host computer 101 is connected to the network 103 via a network I/F 105. The host computer 101 according to the present embodiment is, for example, a personal computer (PC). The printing apparatus 102 according to the present embodiment is an application example of an information processing apparatus.

The printer driver 104 is software that runs on an operating system (OS) which controls the host computer 101. Further, the printer driver 104 writes print data in Page Description Language (PDL) according to a print instruction from an application and transmits the data written in PDL as a print job to the printing apparatus 102.

The network I/F 105 is used when communication with an external apparatus is performed via the network 103. For example, the network I/F 105 is used for Internet communication using Transmission Control Protocol/Internet Protocol (TCP/IP) and data transmission/reception with the printing apparatus 102.

The host computer 101 generally includes a central processing unit (CPU), a hard disk, a random access memory (RAM), and an input/output device. Since these are general purpose devices, their descriptions are not given.

The printing apparatus 102 includes a network I/F 106, a CPU 107, a random access memory (RAM) 108, a storage unit 109, an image processing unit 110, an image forming unit 111, an operation unit 112, and a system bus 113. The printing apparatus 102 is, for example, a printer.

The network I/F 106 is used for communication between the printing apparatus 102 and an external apparatus via the network 103 and controls the communication on the network 103. The Internet communication using TCP/IP and data transmission/reception between the printing apparatus 102 and the host computer 101 can be performed via the network I/F 106.

The CPU 107 executes various types of processing such as numerical calculation, information processing, and device control. Such processing is based on various programs stored in the storage unit 109 of the printing apparatus 102 and loaded onto the RAM 108. The RAM 108 is a general volatile storage device which can be directly accessed from the CPU 107. The RAM 108 is used as a work area for the CPU 107 and is also used as a temporary data storage area. The storage unit 109 temporarily or permanently stores a print job sent from the host computer 101. The storage unit 109 is, for example, a hard disk drive.

The image processing unit 110 generates image data by processing a job such as a copy job or a print job written in PDL, and transfers the generated image data to the image forming unit 111 described below. The page description language, such as Post Script (PS) and Printer Control Language (PCL), is a language that describes a command used for controlling a page printer. When a print job is input, the image processing unit 110 performs image processing of the print job according to a print attribute, and generates image data by performing rasterization for each page.

The image forming unit 111 can print raster data being the image data output from the image processing unit 110. The image forming unit 111 can be configured by a printer engine. In other words, the image forming unit 111 forms an image from the raster data, which has been generated by the image processing unit 110 according to raster image processor (RIP) processing. The image is printed on print paper and a print product is produced. According to the present embodiment, since the image is formed by an electrophotographic recording method, toner is used. However, other image forming units, which use ink in place of toner, can also be used.

The operation unit 112 is a user interface via which the operator operates the printing apparatus 102. The operation unit 112 includes, for example, a liquid crystal display (LCD) touch panel.

The network 103 is a global network such as the Internet or a local network such as a local area network (LAN). The network 103 connects the printing apparatus 102 and the host computer 101. Further, a network communication technique represented by TCP/IP is used for the connection.

Next, the image processing unit 110 will be described in detail. The image processing unit 110 recognizes the carbonless copy paper (i.e., top sheet, middle sheet, and bottom sheet) set in each paper feeder. The back of the top sheet is coated with color former. The middle sheet is coated with a color developer on the front and the color former on the back. The bottom sheet is coated with the color developer on the front. If carbonless copy paper is designated by a print job, as for the copy paper for the first page of the print job, the image processing unit 110 instructs the image forming unit 111 to feed the paper from the paper feeder where the carbonless copy paper with the top sheet attribute is set.

Further, as for the copy paper for the last page of the print job, the image processing unit 110 instructs the image forming unit 111 to feed the paper from the paper feeder where the carbonless copy paper with the bottom sheet attribute is set. Furthermore, as for the copy paper for the intermediate pages of the print job, the image processing unit 110 instructs the image forming unit 111 to feed the paper from the paper feeder where the carbonless copy paper with the middle sheet attribute is set.

The carbonless copy paper with the top sheet attribute, the carbonless copy paper with the middle sheet attribute, and the carbonless copy paper with the bottom sheet attribute are types of print paper, comparable with plain paper, thick paper, thin paper, glossy paper, and overhead projector (OHP) print paper.

Figure 2:
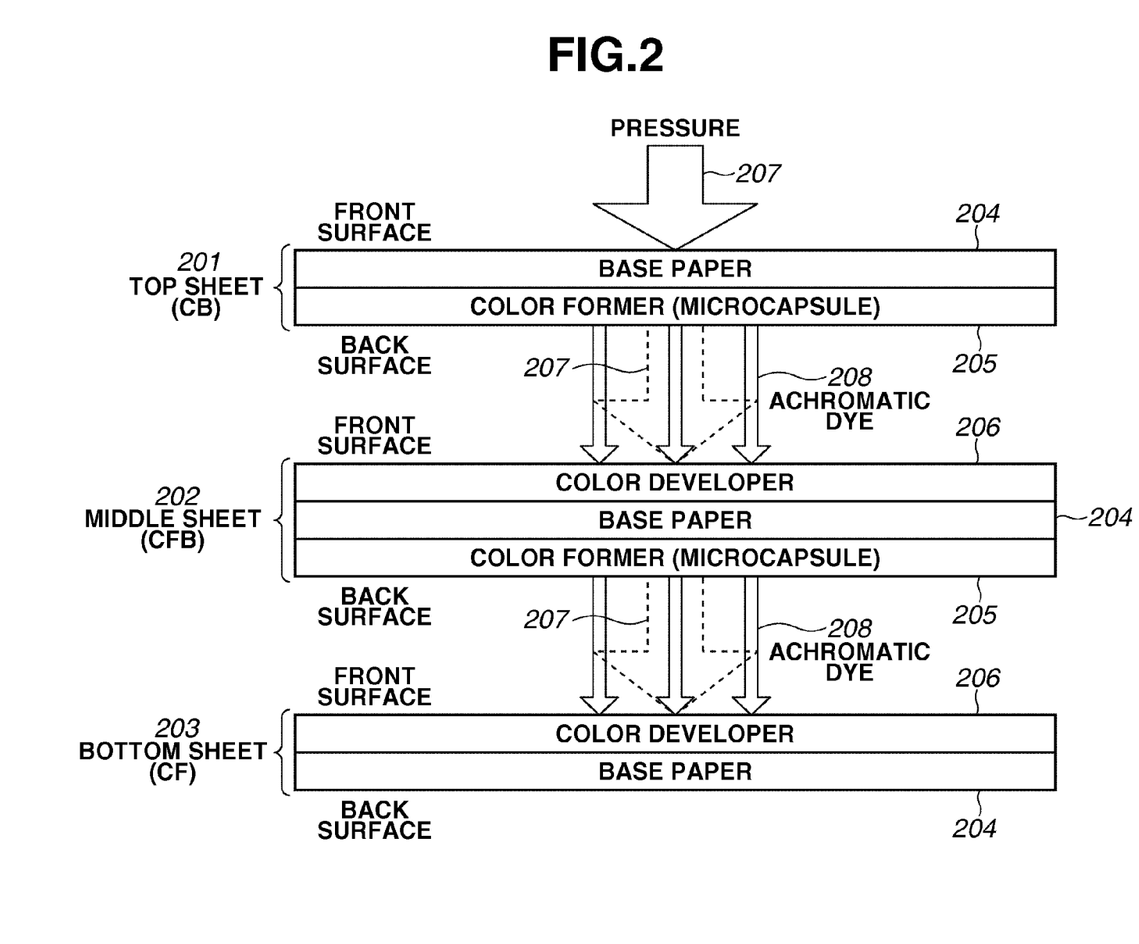
FIG. 2 is a schematic diagram of a cross section of carbonless copy paper used in the first embodiment.

FIG. 2 is a schematic diagram of a cross section of the carbonless copy paper applied to the present embodiment. There are three types of carbonless copy paper: a top sheet 201, a middle sheet 202, and a bottom sheet 203. The top sheet 201 is called "coated back (CB)", the middle sheet 202 is called "coated front/back (CFB)", and the bottom sheet 203 is called "coated front (CF)".

The top sheet 201 includes base paper 204 and a layer of color former 205. The middle sheet 202 includes a layer of color developer 206, base paper 204, and a layer of the color former 205. The bottom sheet 203 includes a layer of color developer 206 and base paper 204. The layer of color former 205 is formed by coating the surface of the base paper 204 with microcapsules including electron-releasing color former, and drying the coated surface. The layer of color developer 206 is formed by coating the back side of the base paper 204 with electron-accepting color developer and drying the coated surface.

If a person writes on the surface of the top sheet 201 with a writing instrument such as a pen, a pressure 207 is transferred to the microcapsule of the color former 205 on the back of the top sheet. The pressure causes the microcapsule to break and spill achromatic dye 208 being the color former. The achromatic dye 208 chemically reacts with the color developer 206 on the front surface of the middle sheet 202 and color is delivered. Accordingly, a copy is made. Similarly, the pressure 207 is transferred to the bottom sheet 203 via the middle sheet 202. By a similar chemical reaction, color is delivered to the bottom sheet 203. Accordingly, a copy using carbonless copy paper is made.

The structure of the carbonless copy paper used in the present embodiment is not limited to the structure illustrated in FIG. 2. Any type of paper can be used so long as it has the structure of general carbonless copy paper. The carbonless copy paper according to the present embodiment has the color former 205 coated on at least one side of a sheet and the color developer 206 coated on at least one side of another sheet. Further, the surface of the color former 205 contacts the surface of the color developer 206. If the above-described conditions are satisfied, an arbitrary combination of the top sheet 201, the middle sheet 202, and the bottom sheet 203 can be used. Further, an arbitrary number of sheets can be used.

Figure 3:
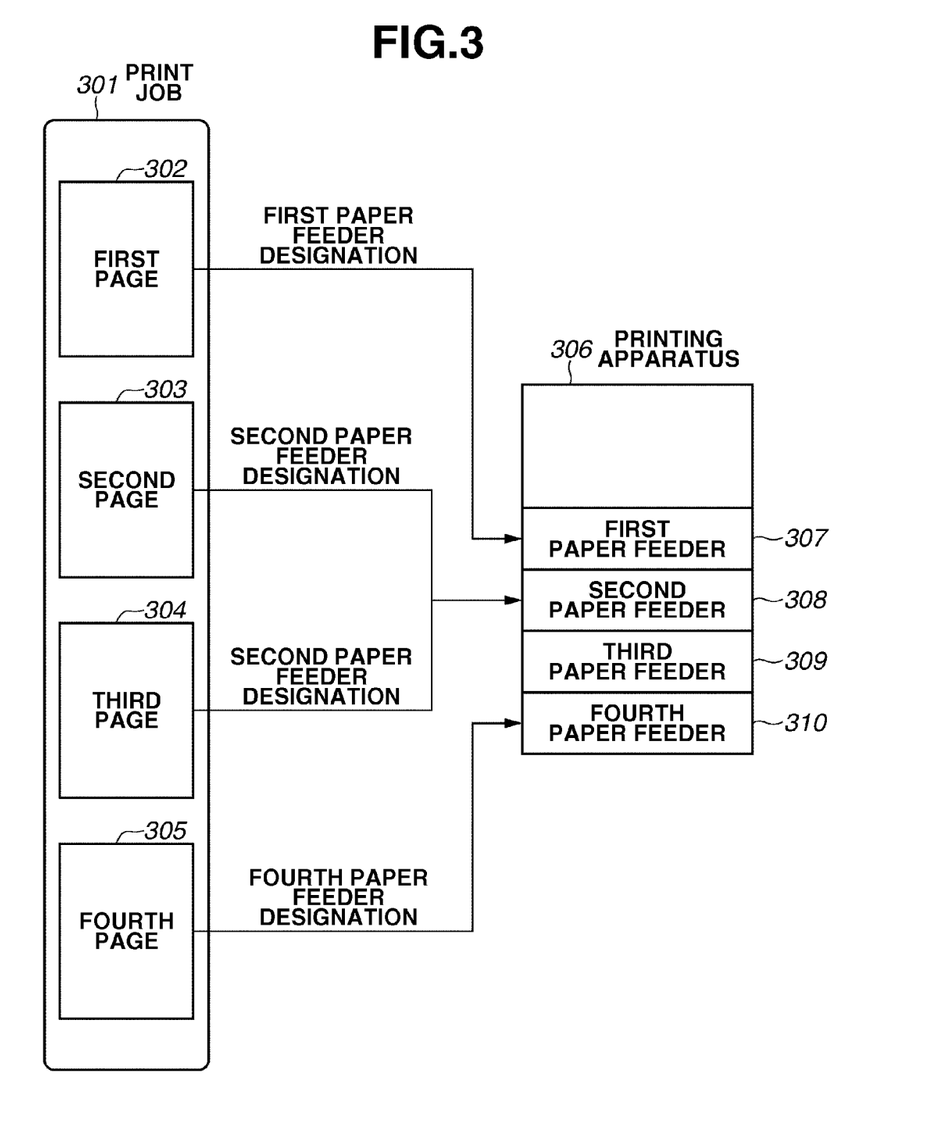
FIG. 3 illustrates an example of designation of print paper, which is used when each document is printed, according to designation of a paper feeder for comparison purposes with the printing system according to the first embodiment.

FIG. 3 illustrates an example of designation of the print paper used for each document by designating the paper feeder. The illustration is presented for comparison purposes with the printing system according to the present embodiment. A print job 301 is a print job of a total of four pages, which are a first page 302, a second page 303, a third page 304, and a fourth page 305. A printing apparatus 306 has a total of four paper feeders, which are a first paper feeder 307, a second paper feeder 308, a third paper feeder 309, and a fourth paper feeder 310. Paper of an arbitrary type and size is set in each paper feeder by the operator of the printing apparatus 306.

The print job 301, which is submitted to the printing apparatus 306 as a copy job or a print job written in PDL, includes information regarding the paper feeder of the printing apparatus 306 in which the copy paper that corresponds to each page is set. According to the print job 301 illustrated in FIG. 3, the first page 302 is designated to be printed with paper fed from a first paper feeder, the second page 303 and the third page 304 are designated to be printed with paper fed from a second paper feeder, and a fourth page 305 is designated to be printed with paper fed from a fourth paper feeder. When receiving the print job 301, the printing apparatus 306 executes, according to the instruction, printing by feeding paper for the first page 302 from the first paper feeder 307, paper for the second page 303 and the third page 304 from the second paper feeder 308, and paper for the fourth page 305 from the fourth paper feeder 310.

The operator needs to know the type of print paper set in each paper feeder of the printing apparatus 306. In other words, in order to print one set of carbonless copy paper, the operator needs to know the copy paper set in each paper feeder of the printing apparatus 306. In other words, the operator needs to know the paper feeders corresponding to the carbonless copy paper with the top sheet attribute, the carbonless copy paper with the middle sheet attribute, and the carbonless copy paper with the bottom sheet attribute, and designate the paper feeder for each page of the print job.

However, due to the characteristic of the carbonless copy paper, accurate print designation of each sheet with different attribute is difficult. Further, since whether the print paper designated for each paper feeder is properly set is dependent on the operator, whether a desired print product can be obtained is uncertain. Thus, the printing method that employs the designation of the paper feeder for each page is not appropriate for printing a set of ledger sheets using carbonless copy paper with ease and accuracy.

Figure 4:
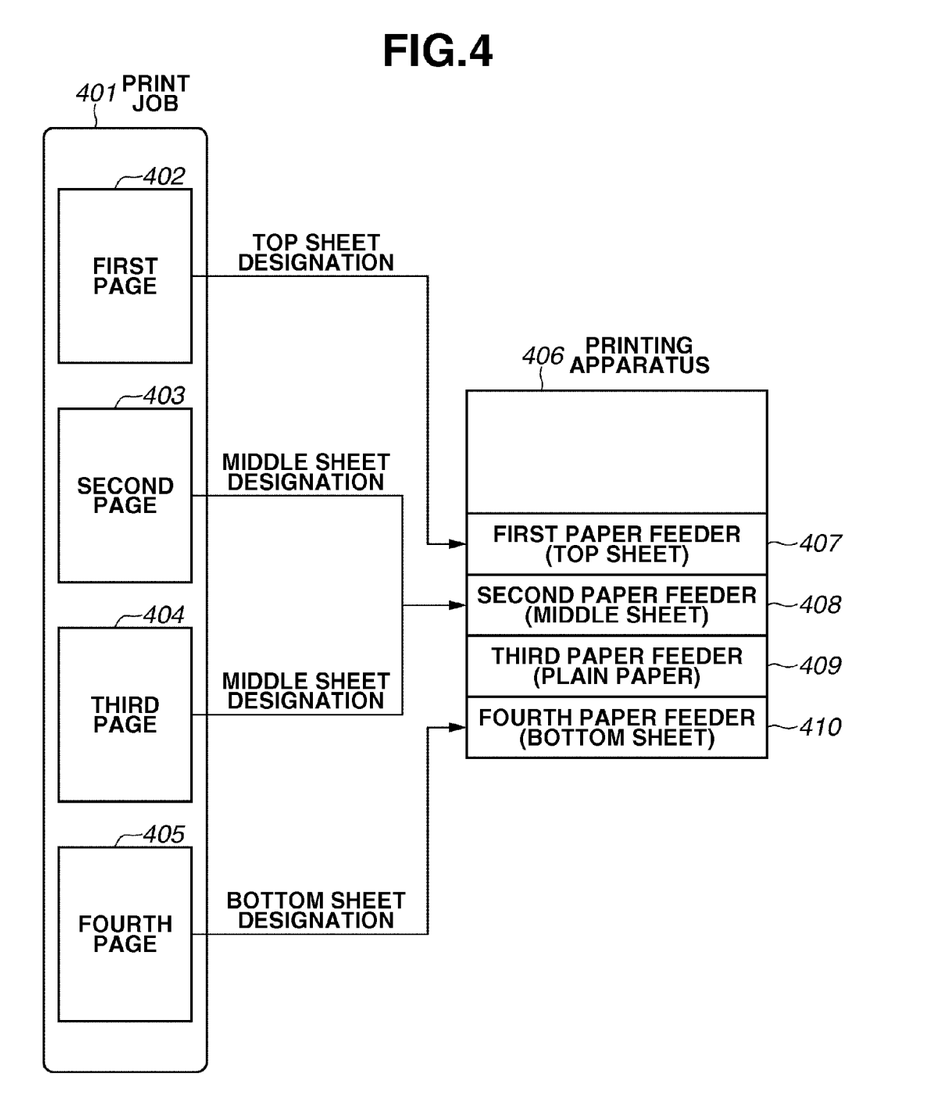
FIG. 4 illustrates another example of designation of print paper, which is used when each document is printed, according to designation of a paper type for comparison purposes with the printing system according to the first embodiment.

FIG. 4 illustrates another example of designation of the print paper used for each document according to designation of a paper type. The illustration is presented for comparison purposes with the printing system according to the present embodiment. A print job 401 is a print job of a total of four pages, which are a first page 402, a second page 403, a third page 404, and a fourth page 405. A printing apparatus 406 has a total of four paper feeders, which are a first paper feeder 407, a second paper feeder 408, a third paper feeder 409, and a fourth paper feeder 410. Paper of an arbitrary type and size is set in each paper feeder by the operator of the printing apparatus 406.

According to the example illustrated in FIG. 4, carbonless copy paper with the top sheet attribute, carbonless copy paper with the middle sheet attribute, plain paper, and carbonless copy paper with the bottom sheet attribute are set in the first paper feeder 407, the second paper feeder 408, the third paper feeder 409, and the fourth paper feeder 410, respectively. The printing apparatus 406 recognizes the type of print paper set in each paper feeder.

The print job 401, which is submitted to the printing apparatus 406 as a copy job or a print job written in PDL, includes information regarding the type of print paper that corresponds to each page. According to the print job 401 illustrated in FIG. 4, carbonless copy paper with the top sheet attribute is to be used for the first page 402, carbonless copy paper with the middle sheet attribute is to be used for the second page 403 and the third page 404, and carbonless copy paper with the bottom sheet attribute is to be used for the fourth page 405.

When the printing apparatus 406 receives the print job 401, according to the instruction of the print job 401, copy paper is fed from the first paper feeder 407 for the first page 402. The first paper feeder 407 is where the carbonless copy paper with the top sheet attribute is set. Similarly, copy paper is fed from the second paper feeder 408 for the second page 403 and the third page 404. The second paper feeder 408 is where the carbonless copy paper with the middle sheet attribute is set. Similarly, copy paper is fed from the fourth paper feeder 410 for the fourth page 405. The fourth paper feeder 410 is where the carbonless copy paper with the bottom sheet attribute is set.

In order to print one set of ledger sheets, the operator needs to designate the carbonless copy paper with the top sheet attribute, the carbonless copy paper with the middle sheet attribute, and the carbonless copy paper with the bottom sheet attribute for each page of the print job. However, due to the characteristics of the carbonless copy paper, accurate print designation of each sheet with different attribute is complicated. Further, since the designation is dependent on the operator, whether a desired print product can be obtained is uncertain. Thus, the printing method that employs the designation of the paper type for each page is not appropriate for printing a set of ledger sheets using carbonless copy paper with ease and accuracy.

Figure 5:
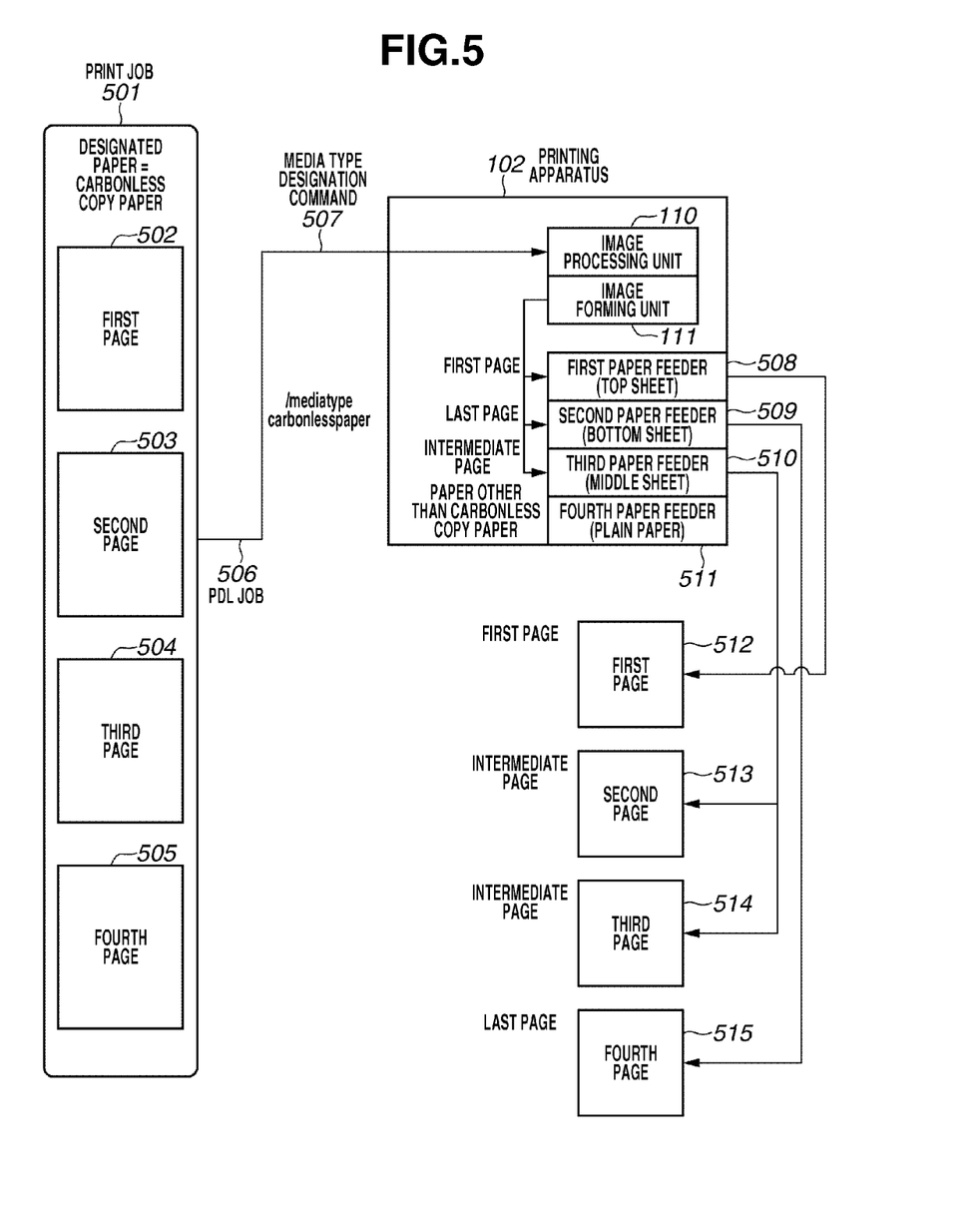
FIG. 5 illustrates an operation of the printing system according to the first embodiment.

FIG. 5 illustrates the operation of the printing system according to the first embodiment. A print job 501 is a print job of a total of four pages, which are a first page 502, a second page 503, a third page 504, and a fourth page 505.

As illustrated in FIG. 1, the printing apparatus 102 includes the image processing unit 110 and the image forming unit 111. The image forming unit 111 includes a total of four paper feeders, which are a first paper feeder 508, a second paper feeder 509, a third paper feeder 510, and a fourth paper feeder 511. The image processing unit 110 recognizes the type of copy paper set in each paper feeder. Carbonless copy paper with the top sheet attribute is set in the first paper feeder 508. Carbonless copy paper with the bottom sheet attribute is set in the second paper feeder 509. Carbonless copy paper with the middle sheet attribute is set in the third paper feeder 510. Further, plain paper is set in the fourth paper feeder 511.

The print job 501, which is written in PDL and submitted from the host computer 101 to the printing apparatus 102 via the printer driver 104, includes information of the type of print paper used for the entire print job 501.

Regarding the print job 501 according to the present embodiment, since the use of carbonless copy paper is designated, the operator does not need to designate each attribute of the carbonless copy paper for each page. Thus, the user does not need to designate the top sheet attribute, the middle sheet attribute, and the bottom sheet attribute. The print job 501 includes a job 506. The job 506 is a print command written in PDL. A media type designation command 507 is included in the print command. According to the present embodiment, a command that indicates carbonless copy paper (e.g., "/mediatype carbonlesspaper") is included in the media type designation command 507.

If the image forming unit 111 of the printing apparatus 102 receives the print job 501 and the print paper designated by the job is carbonless copy paper, regarding the first page of the print job (i.e., the first page 502), the image forming unit 111 feeds the copy paper from the first paper feeder 508 where the carbonless copy paper with the top sheet attribute is set and performs printing. Further, regarding the last page of the print job (i.e., the fourth page 505), the image forming unit 111 feeds the copy paper from the second paper feeder 509 where the carbonless copy paper with the bottom sheet attribute is set and performs printing. Furthermore, regarding the pages other than the top and the last pages of the print job (i.e., the second page 503 and the third page 504), the image forming unit 111 feeds the copy paper from the third paper feeder 510 where the carbonless copy paper with the middle sheet attribute is set and performs printing.

In this manner, as for the print job 501, by simply designating the type of print paper (carbonless copy paper) as the paper to be used, the first page 502 of the print job is automatically printed on the carbonless copy paper with the top sheet attribute and output as a first page 512. Similarly, the second page 503 and the third page 504 of the print job are automatically printed on the carbonless copy paper with the middle sheet attribute and output as a second page 513 and a third page 514 . Similarly, the fourth page 505 is automatically printed on the carbonless copy paper with the bottom sheet attribute and output as a fourth page 515.

Figure 6:
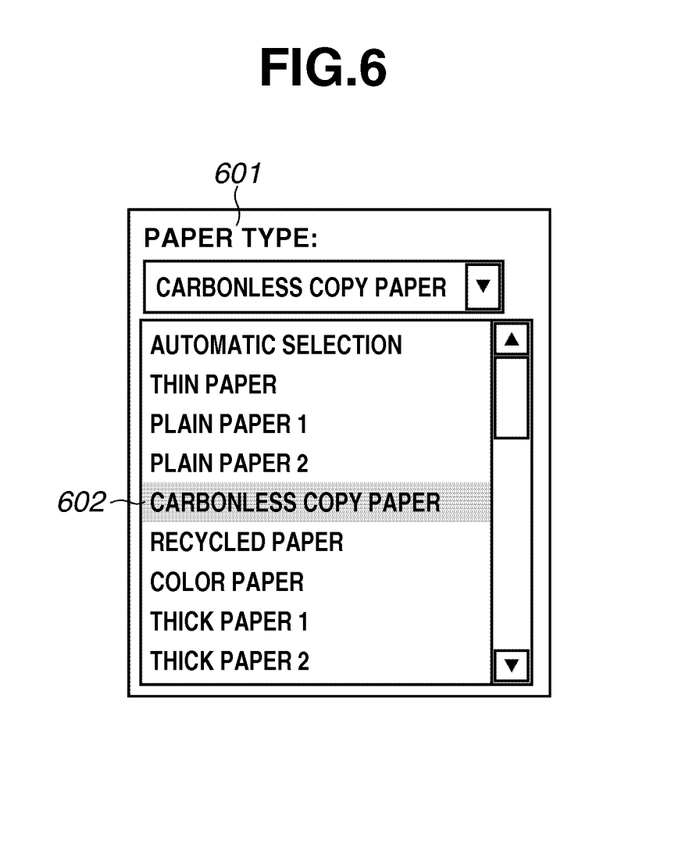
FIG. 6 illustrates an example of a user interface (UI) of a printer driver according to the first embodiment.

FIG. 6 illustrates an example of a UI of the printer driver 104. A UI 601 of the printer driver 104 is a pull-down UI. The operator selects a type of print paper for the print job from the pull-down menu. The UI 601 is displayed by the printer driver 104, which runs on the host computer 101. Although many types of print paper can be selected via the UI 601, the paper selected in the illustration in FIG. 6 is carbonless copy paper 602. If the carbonless copy paper 602 is selected via the UI 601, a PDL command indicating the carbonless copy paper 602 is written in the print job 501.

Figure 7:
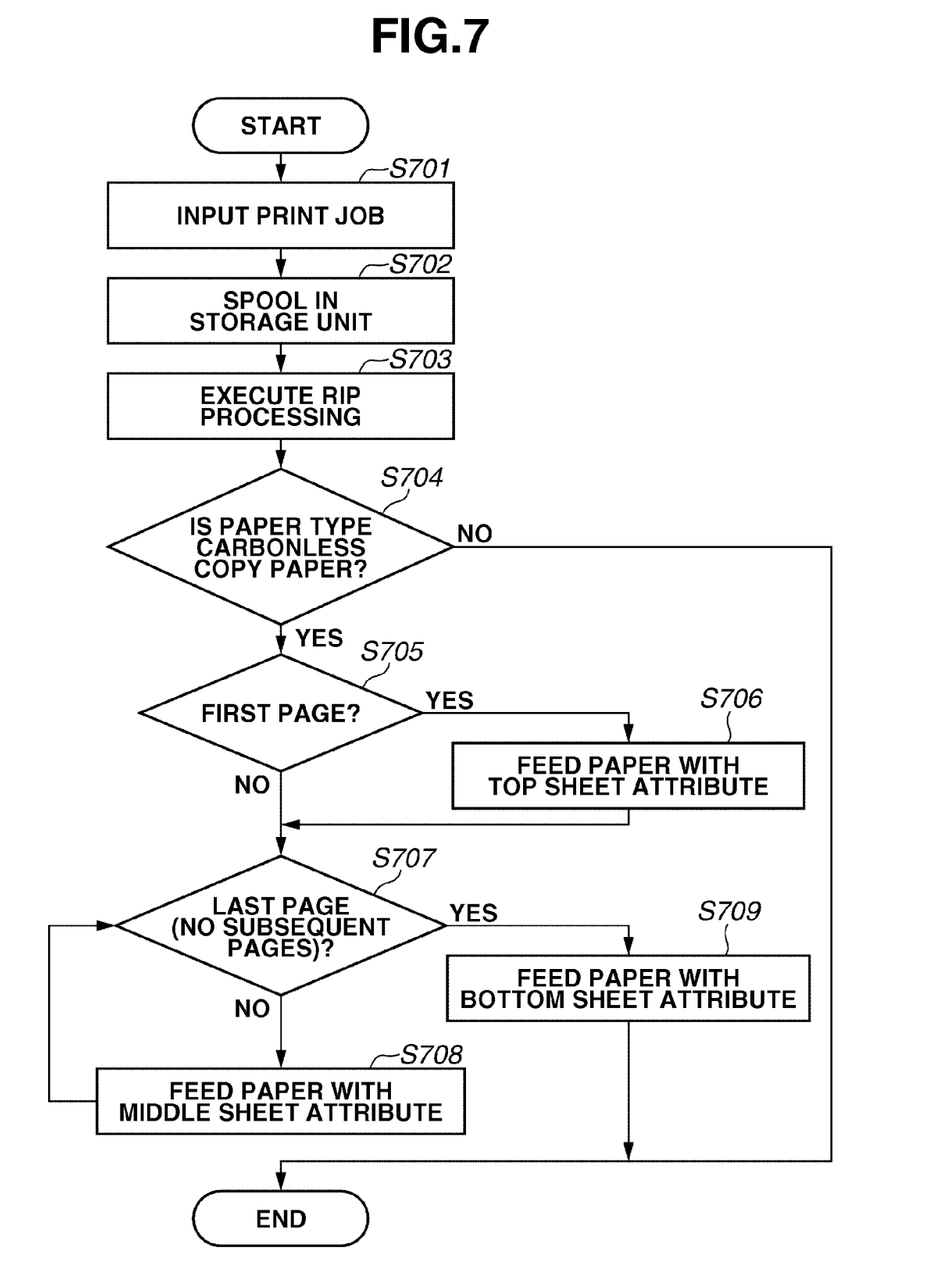
FIG. 7 is a flowchart illustrating processing performed by the printing system according to the first embodiment.

FIG. 7 is a flowchart illustrating processing performed by the printing system according to the first embodiment. In step S701, the image processing unit 110 receives the print job 501 from the host computer 101. In step S702, the image processing unit 110 temporarily spools the print job 501 in the storage unit 109. In step S703, the image processing unit 110 executes RIP processing of the print job 501.

In step S704, the image processing unit 110 determines whether the type of print paper, which is designated in the print job 501, is carbonless copy paper. If the designated paper is carbonless copy paper (YES in step S704) , the processing proceeds to step S705. On the other hand, if the designated paper is not carbonless copy paper (NO in step S704) , then the processing ends.

In step S705, the image processing unit 110 determines whether the page to be subjected to the RIP processing is the first page. If the page to be subjected to the RIP processing is the first page (YES in step S705) , the processing proceeds to step S706. On the other hand, if the page to be subjected to the RIP processing is not the first page (NO in step S705), then the processing proceeds to step S707.

Step S701 is an example of processing performed by a reception unit. Step S704 is an example of processing performed by a determination unit.

In step S706, the image forming unit 111 feeds the copy paper from the paper feeder in which the carbonless copy paper with the top sheet attribute is set and performs printing. In step S707, the image processing unit 110 determines whether the page which is to be subjected to the RIP processing is the last page, in other words, whether the subsequent pages does not exist. If the page is the last page (YES in step S707), the processing proceeds to step S709. On the other hand, if the page is not the last page (NO in step S707), the processing proceeds to step S708.

In step S709, the image forming unit 111 feeds the copy paper from the paper feeder in which the carbonless copy paper with the bottom sheet attribute is set and performs printing. Then, the processing ends.

In step S708, the image forming unit 111 feeds the copy paper from the paper feeder in which the carbonless copy paper with the middle sheet attribute is set and performs printing. Then, the processing returns to step S707. Steps S706, S708, and S709 are examples of processing performed by an assignment unit.

As described above, according to the first embodiment, each page of the print job can be printed on carbonless copy paper with the expected attribute. The carbonless copy paper is automatically fed without complicated designation of the paper feeder or setting of the paper type. Thus, according to the first embodiment, a set of ledger sheets using carbonless copy paper can be printed with ease and accuracy.

Next, a second embodiment of the present invention will be described. Descriptions of components and processing in the second embodiment similar to those of the first embodiment are not repeated.

Regarding printing of ledger sheets using a set of sheets (carbonless copy paper), a proper print product cannot be obtained unless all the required carbonless copy paper is printed.

For example, regarding printing of carbonless copy paper in the order of carbonless copy paper with the top sheet attribute, carbonless copy paper with the middle sheet attribute, and carbonless copy paper with the bottom sheet attribute, even if the printing apparatus 102 is short of the carbonless copy paper with the bottom sheet attribute, the carbonless copy paper with the top sheet attribute and the carbonless copy paper with the middle sheet attribute can be printed when the printing is executed. However, since the printing apparatus is short of the carbonless copy paper with the bottom sheet attribute, the printed sheets do not form the complete set of ledger sheets using carbonless copy paper. This is not what the operator intends to produce.

According to the present embodiment, if the printing apparatus 102 is short of carbonless copy paper with a required attribute, a warning message is displayed for the operator. Further, according to the present embodiment, the print processing of the print job 501 is not started until the required carbonless copy paper is supplied to the printing apparatus 102.

According to the present embodiment, the warning message is displayed on an LCD display unit of the operation unit 112 of the printing apparatus 102 for the operator. The display location of the warning message, however, is not limited. Further, the warning method is not limited to displaying a warning message, and other methods such as an alarm can also be used.

Figure 8:
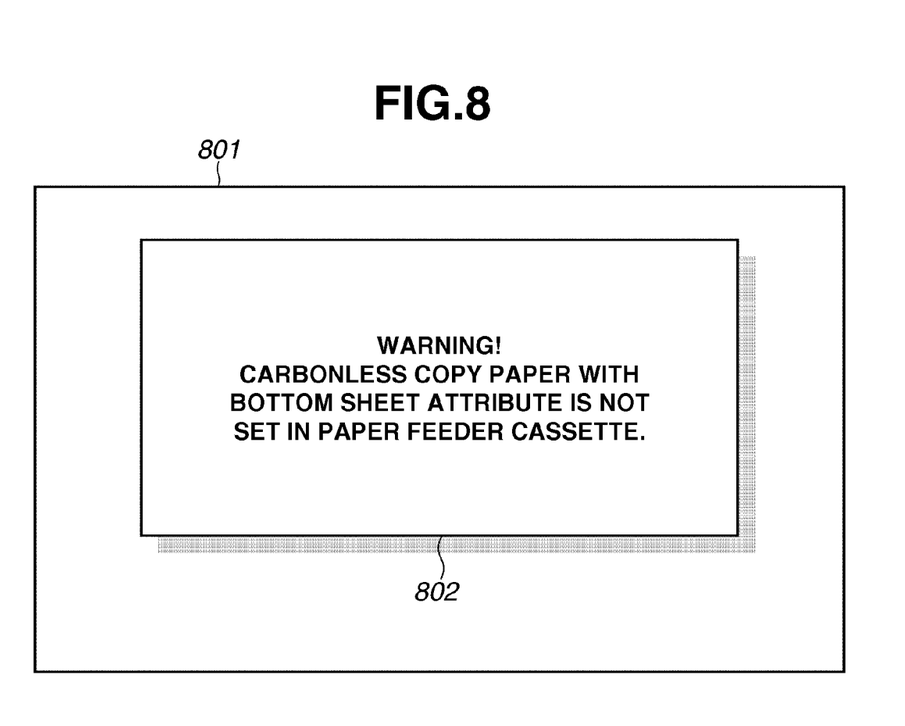
FIG. 8 illustrates an example of a warning display according to a second embodiment of the present invention.

FIG. 8 illustrates an example of the warning message. A display unit 801 in FIG. 8 is a display unit of the operation unit 112 of the printing apparatus 102. The display unit 801 corresponds to the LCD display unit of the operation unit 112. A warning message display screen 802 is displayed on the display unit 801. The warning message display screen 802 is displayed when the printing apparatus 102 is short of carbonless copy paper with a required attribute with respect to printing of carbonless copy paper.

After the print processing is started but before the printing of the top page is performed, this screen is displayed on the LCD unit of the operation unit 112 of the printing apparatus 102 so that the operator can notice the shortage of the paper. Further, the print processing of the print job 501 is not started until the required carbonless copy paper is set for the printing apparatus 102. This processing is an example of processing performed by a first control unit.

As described above, according to the second embodiment, regarding printing of a set of ledger sheets using carbonless copy paper, the operator can prevent an unintended print product from being produced and can acquire a complete set of ledger sheets using carbonless copy paper.

Next, a third embodiment of the present invention will be described. Descriptions of components and processing in the third embodiment similar to those of the first embodiment are not repeated.

Regarding printing of ledger sheets using a set of sheets (carbonless copy paper), an appropriate print product cannot be obtained if alignment of some of the sheets that constitute the print product output from the printing apparatus 102 is shifted when the sheets are discharged.

For example, regarding printing of three pages using carbonless copy paper in the order of carbonless copy paper with the top sheet attribute, carbonless copy paper with the middle sheet attribute, and carbonless copy paper with the bottom sheet attribute, if the alignment of the carbonless copy paper with the middle sheet attribute is shifted from the preceding and the subsequent pages when it is discharged, the alignment of the print product will be poor. This does not satisfy the requirements of the ledger sheets using carbonless copy paper.

Thus, according to the present embodiment, if the carbonless copy paper to be printed is changed while the print job 501 is being executed, the image processing unit 110 instructs the image forming unit 111 to align the carbonless copy paper sheets when they are discharged. Such a case is, for example, where the copy paper is changed from the carbonless copy paper with the top sheet attribute to the carbonless copy paper with the middle sheet attribute, the carbonless copy paper with the middle sheet attribute is changed to the carbonless copy paper with the bottom sheet attribute, and the carbonless copy paper with the top sheet attribute is changed to the carbonless copy paper with the bottom sheet attribute. The page break is not limited to the above-described example.

Figure 9:
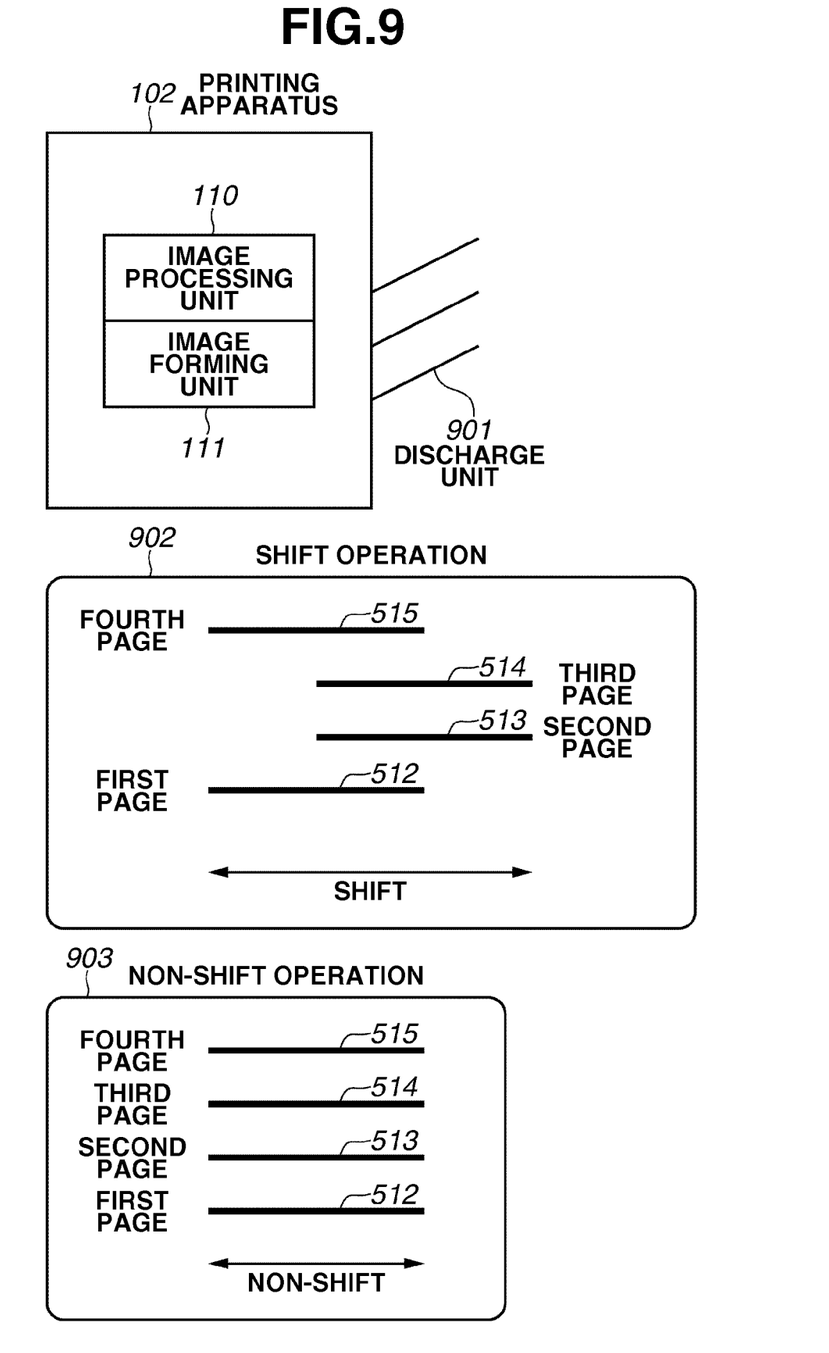
FIG. 9 illustrates a discharge operation of the printing apparatus according to a third embodiment of the present invention.

FIG. 9 illustrates the discharge operation of the printing apparatus 102 according to the third embodiment. The printing apparatus 102 includes, as illustrated in FIG. 1, the image processing unit 110 and the image forming unit 111. The image forming unit 111 includes a discharge unit 901. The discharge unit 901 is used for discharging the print paper printed by the image forming unit 111 from the printing apparatus 102. Further, the discharge unit 901 includes a plurality of discharge trays. When the sheets are discharged, the discharge unit 901 is capable of shifting the sheets in the directions perpendicular to the discharge direction.

Next, the discharge processing when the discharge unit 901 performs the shifting/non-shifting operation of the paper will be described. Positions 902 in FIG. 9 illustrate the discharge positions of the printing-completed print paper as a result of the shift operation of the discharge unit 901. Further, positions 903 in FIG. 9 illustrate the discharge positions of the printing-completed print paper as a result of the non-shift operation of the discharge unit 901.

The printing apparatus 102 discharges the printed paper on the discharge unit 901 in the order of the first page 512, the second page 513, the third page 514, and the fourth page 515. In the positions 902 illustrated in FIG. 9, when the shift operation is performed by the discharge unit, the carbonless copy paper with the top sheet attribute is not in alignment with the carbonless copy paper with the middle sheet attribute, and the carbonless copy paper with the middle sheet attribute is not in alignment with the carbonless copy paper with the bottom sheet attribute. A set of ledger sheets using carbonless copy paper with poor alignment is not satisfactory and thus not regarded as one complete set of print products.

On the other hand, in the positions 903 illustrated in FIG. 9, when the non-shift operation is performed, each sheet of carbonless copy paper is not shifted when it is discharged. Since both ends of all the sheets are aligned when they are discharged on the discharge unit 901, a set of ledger sheets using carbonless copy paper with good alignment can be obtained. According to the present embodiment, as in the positions 903 illustrated in FIG. 9, all the sheets are discharged according to the non-shift operation regarding the carbonless copy paper with various attributes. The above-described non-shift operation is an example of processing performed by a second control unit.

According to the present embodiment, with respect to printing of a set of ledger sheets using carbonless copy paper, generation of one set of print products with poor alignment, which the operator does not intend to produce, can be prevented. Thus, a complete set of print products with good alignment can be obtained.

Next, a fourth embodiment of the present invention will be described. Descriptions of components and processing in the fourth embodiment similar to those of the first embodiment are not repeated.

According to the first embodiment, if the operator selects carbonless copy paper via the UI 601 of the printer driver 104, information indicating that the carbonless copy paper has been designated is written in PDL to the print job 501. Then, the carbonless copy paper with the attribute appropriate for each page is assigned and printed by the printing apparatus 102.

According to the forth embodiment, the printer driver 104 determines and assigns the carbonless copy paper with the attribute appropriate for each page. Then, the printer driver 104 writes the information that designates the attribute of the carbonless copy paper for each page in PDL into the print job. The printing apparatus 102, when receiving the print job, feeds the carbonless copy paper with the attribute appropriate for each page based on the information included in the print job from the corresponding paper feeder, and performs printing.

Figure 10:
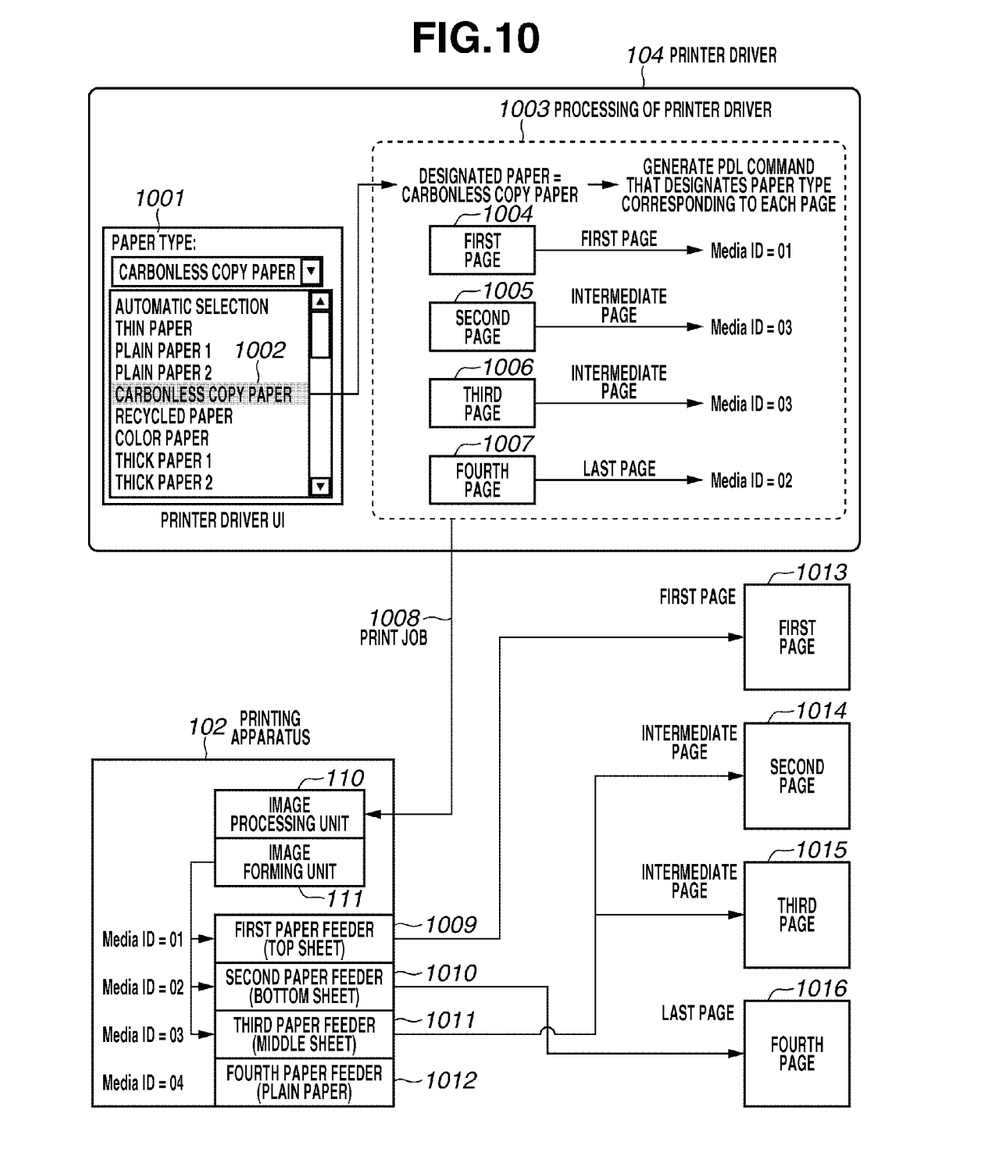
FIG. 10 illustrates an operation of the printing system according to a fourth embodiment of the present invention.

FIG. 10 illustrates an operation performed by the printing system according to the fourth embodiment. The printer driver 104 includes a UI 1001. If the operator selects carbonless copy paper 1002 via the UI 1001, processing 1003 is performed by the printer driver 104, and a print job 1008 written in PDL is generated. According to the processing 1003 in the printer driver 104, the printer driver 104 generates a PDL command that designates a type of print paper that corresponds to each page.

The printer driver 104 acquires information used for identifying the type of print paper set in each paper feeder of the printing apparatus 102 from the printing apparatus 102 before generating the print job 1008. The host computer 101 according to the present embodiment is an application example of an information processing apparatus.

As illustrated in FIG. 1, the printing apparatus 102 includes the image processing unit 110 and the image forming unit 111. The image forming unit 111 includes a total of four paper feeders, which are a first paper feeder 1009, a second paper feeder 1010, a third paper feeder 1011, and a fourth paper feeder 1012. The image processing unit 110 recognizes the type of copy paper set in each paper feeder. Carbonless copy paper with the top sheet attribute is set in the first paper feeder 1009. Carbonless copy paper with the bottom sheet attribute is set in the second paper feeder 1010. Carbonless copy paper with the middle sheet attribute is set in the third paper feeder 1011. Further, plain paper is set in the fourth paper feeder 1012.

According to the present embodiment, a media identification (ID) is used for the identification of the type of print paper. For example, a media ID 01 is set for the carbonless copy paper with the top sheet attribute, a media ID 02 is set for the carbonless copy paper with the bottom sheet attribute, a media ID 03 is set for the carbonless copy paper with the middle sheet attribute, and a media ID 04 is set for plain paper. The method and content used for identifying the type of print paper is not limited to the example described above.

The print job 1008 is a print job of a total of four pages, which are a first page 1004, a second page 1005, a third page 1006, and a fourth page 1007. If the operator selects the carbonless copy paper 1002 via the UI 1001, according to the processing 1003 in the printer driver 104, an appropriate media ID is set for each page.

The printer driver 104 uses the media ID 01 for the first page 1004 being the first page. The media ID 01 indicates the carbonless copy paper with the top sheet attribute and is written in PDL. Similarly, the printer driver 104 uses the media ID 02 for the fourth page 1007 being the last page. The media ID 02 indicates the carbonless copy paper with the bottom sheet attribute and is written in PDL. Further, the printer driver 104 uses the media ID 03 for the second page 1005 and the third page 1006 being the intermediate pages. The media ID 03 indicates the carbonless copy paper with the middle sheet attribute and is also written in PDL.

The image processing unit 110 instructs the image forming unit 111 to feed paper and print each page according to the print job 1008 written in PDL. As for the first page 1004, since the media ID described in the print job 1008 is "01", the image processing unit 110 instructs the image forming unit 111 to feed the carbonless copy paper with the media ID 01 (the top sheet attribute) from the first paper feeder 1009 and perform printing. Similarly, the media ID described in the print job 1008 is "03" for the second page 1005 and the third page 1006. Thus, the image processing unit 110 instructs the image forming unit 111 to feed the carbonless copy paper with the media ID 03 (the middle sheet attribute) from the third paper feeder 1011 and perform printing.

Furthermore, as for the fourth page 1007, since the media ID described in the print job 1008 is "02", the image processing unit 110 instructs the image forming unit 111 to feed the carbonless copy paper with the media ID 02 (the bottom sheet attribute) from the second paper feeder 1010 and perform printing.

In this manner, by the operator simply designating the carbonless copy paper as the print paper to be used via the UI 1001 of the printer driver 104, the first page 1004 is automatically printed on the carbonless copy paper with the top sheet attribute and output as a first page 1013. Similarly, the second page 1005 and the third page 1006 are automatically printed on the carbonless copy paper with the middle sheet attribute and output as a second page 1014 and a third page 1015. Further, the fourth page 1007 is automatically printed on the carbonless copy paper with the bottom sheet attribute and output as a fourth page 1016.

Figure 11:
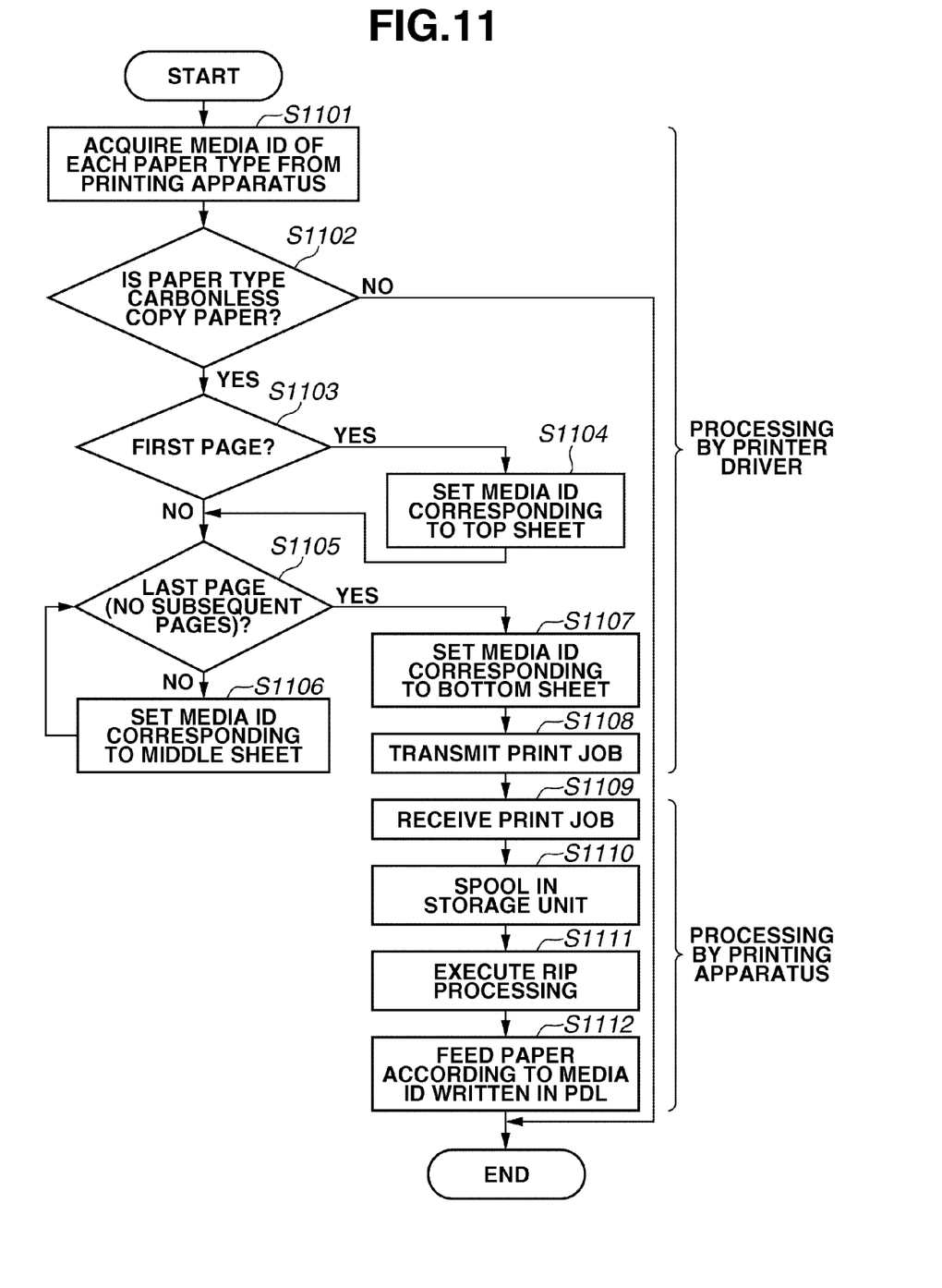
FIG. 11 is a flowchart illustrating processing performed by the printing system according to the fourth embodiment.

FIG. 11 is a flowchart illustrating processing performed by the printing system according to the fourth embodiment. Regarding the flowchart, processing in steps S1101 to S1108 is performed by the printer driver 104, and processing insteps S1109 to S1112 is performed by the printing apparatus 102.

In step S1101, the printer driver 104 acquires a media ID being the information used for the identification of each type of print paper from the image processing unit 110 of the printing apparatus 102. In this step, suppose that at least a media ID of the carbonless copy paper with the top sheet attribute, a media ID of the carbonless copy paper with the middle sheet attribute, and a media ID of the carbonless copy paper with the bottom sheet attribute are acquired.

In step S1102, the printer driver 104 determines whether the type of print paper designated by the operator is carbonless copy paper. If the type of print paper designated by the operator is carbonless copy paper (YES in step S1102), the processing proceeds to step S1103. On the other hand, if the type of print paper designated by the operator is not carbonless copy paper (NO in step S1102), then the processing ends.

In step S1103, the printer driver 104 determines whether the page to be processed is the first page. If the page to be processed is the first page (YES in step S1103), the processing proceeds to step S1104. On the other hand, if the page to be processed is not the first page (NO in step S1103), the processing proceeds to step S1105.

In step S1104, the printer driver 104 sets the media ID that indicates the carbonless copy paper with the top sheet attribute as the media ID of the type of print paper that corresponds to the page to be processed. In step S1105, the printer driver 104 determines whether the page to be processed is the last page, in other words, whether a subsequent page does not exist. If the page to be processed is the last page (YES in step S1105), the processing proceeds to step S1107. On the other hand, if the page to be processed is not the last page (NO in step S1105), the processing proceeds to step S1106.

In step S1106, the printer driver 104 sets the media ID that indicates the carbonless copy paper with the middle sheet attribute as the media ID of the type of print paper that corresponds to the page to be processed. Then, the processing returns to step S1105.

In step S1107, the printer driver 104 sets the media ID that indicates the carbonless copy paper with the bottom sheet attribute as the media ID of the type of print paper that corresponds to the page to be processed. In step S1108, the printer driver 104 generates the print job 1008 including the media ID set for each page and written in PDL, and transmits the print job to the printing apparatus 102.

In step S1109, the image processing unit 110 of the printing apparatus 102 receives the print job 1008 from the host computer 101 (the printer driver 104). In step S1110, the image processing unit 110 temporarily spools the print job 1008 in the storage unit 109. In step S1111, the image processing unit 110 executes RIP processing of the print job 1008.

In step S1112, the image forming unit 111 feeds the carbonless copy paper with the corresponding attribute set in the paper feeder according to the media ID set for each page and written in PDL in the print job 1008, and prints each page.

According to the fourth embodiment, the operator does not need to make complicated designation of the paper feeder and set the print paper type for each page of the print job. The carbonless copy paper with the intended attribute is automatically fed and a set of ledger sheets using carbonless copy paper can be printed with ease and accuracy. Further, since the optimum attribute of the carbonless copy paper for each page is assigned not by the printing apparatus but by the printer driver, even if a conventional printing apparatus is used, a set of ledger sheets using carbonless copy paper can be printed with ease and accuracy.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to embodiments, it is to be understood that the invention is not limited to the disclosed embodiments. It will of course be understood that this invention has been described above by way of example only, and that modifications of detail can be made within the scope of this invention.

This application claims priority from Japanese Patent Application No. 2011-005027 filed Jan. 13, 2011, which is hereby incorporated by reference herein in its entirety.

What is claimed is:

1. An information processing apparatus comprising:
a reception unit configured to receive a print instruction for printing a plurality of pages;
a determination unit configured to determine whether a type of print paper designated by the print instruction is carbonless copy paper; and
an assignment unit configured to assign to each of the plurality of pages, if the determination unit determines that the type of print paper designated by the print instruction is carbonless copy paper, carbonless copy paper with an attribute that corresponds to a position of each page within the plurality of pages.

2. The information processing apparatus according to claim 1, further comprising an instruction unit configured to give an instruction such that paper feeding from a paper feeder with the carbonless copy paper assigned by the assignment unit is performed and printing is performed for each of the plurality of pages.

3. The information processing apparatus according to claim 1, further comprising a warning unit configured to give a warning if carbonless copy paper with the attributes required for print processing according to the print instruction is not set in a printing apparatus.

4. The information processing apparatus according to claim 3, further comprising a first control unit configured to perform control such that print processing according to the print instruction is not started until carbonless copy paper with the required attributes is set in the printing apparatus.

5. The information processing apparatus according to claim 1, further comprising a second control unit configured to perform control such that sheets of carbonless copy paper with a first attribute are discharged without being shifted from discharged sheets of carbonless copy paper with a second attribute.

6. The information processing apparatus according to claim 1, further comprising a recognition unit configured to recognize in advance the type of print paper set in a printing apparatus, wherein the assignment unit is configured to assign, to the plurality of pages, the carbonless copy paper with the attribute that corresponds to the position of each page within the plurality of pages, based on the type of print paper recognized in advance by the recognition unit.

7. The information processing apparatus according to claim 1, further comprising an acquisition unit configured to acquire information indicating the type of print paper set in a printing apparatus from the printing apparatus, wherein the assignment unit is configured to assign, to the plurality of pages, the carbonless copy paper with the attribute that corresponds to the position of each page within the plurality of pages, based on the information indicating the type of print paper acquired by the acquisition unit.

8. The information processing apparatus according to claim 1, wherein the assignment unit is configured to assign carbonless copy paper with a top sheet attribute to a first page of the plurality of pages, to assign carbonless copy paper with a bottom sheet attribute to a last page of the plurality of pages, and to assign carbonless copy paper with a middle sheet attribute to a page other than the first page and the last page of the plurality of pages.

9. A method executed by an information processing apparatus, the method comprising:
receiving a print instruction for printing a plurality of pages;
determining whether a type of print paper designated by the print instruction is carbonless copy paper; and
assigning to each of the plurality of pages, if it is determined that the type of print paper designated by the print instruction is carbonless copy paper, carbonless copy paper with an attribute that corresponds to a position of each page within the plurality of pages.

10. A non-transitory computer-readable storage medium storing a program for causing a computer to execute a method comprising:
receiving a print instruction for printing a plurality of pages;
determining whether a type of print paper designated by the print instruction is carbonless copy paper; and
assigning to each of the plurality of pages, if it is determined that the type of print paper designated by the print instruction is carbonless copy paper, carbonless copy paper with an attribute that corresponds to a position of each page within the plurality of pages.

* * * * *